United States Patent
Park et al.

(10) Patent No.: US 9,619,936 B2
(45) Date of Patent: Apr. 11, 2017

(54) METHOD AND APPARATUS FOR QUICKLY GENERATING NATURAL TERRAIN

(71) Applicant: ELECTRONICS AND TELECOMMUNICATIONS RESEARCH INSTITUTE, Daejeon-si (KR)

(72) Inventors: Jeung Chul Park, Daejeon-si (KR); Il Kwon Jeong, Daejeon-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 82 days.

(21) Appl. No.: 14/594,501

(22) Filed: Jan. 12, 2015

(65) Prior Publication Data

US 2015/0262392 A1    Sep. 17, 2015

(30) Foreign Application Priority Data

Mar. 17, 2014   (KR) .................. 10-2014-0031207

(51) Int. Cl.
| | | |
|---|---|---|
| G06T 11/20 | (2006.01) | |
| G06T 17/05 | (2011.01) | |
| G06T 11/00 | (2006.01) | |

(52) U.S. Cl.
CPC ............ G06T 17/05 (2013.01); G06T 11/001 (2013.01)

(58) Field of Classification Search
CPC  G06T 17/05; G06T 7/40; G06T 19/00; G01C 11/02
USPC ........................................... 345/441
See application file for complete search history.

(56) References Cited

U.S. PATENT DOCUMENTS

| | | | | |
|---|---|---|---|---|
| 5,748,867 A | * | 5/1998 | Cosman | G06T 15/50 345/428 |
| 6,710,723 B2 | * | 3/2004 | Muller | G08G 5/0086 340/961 |
| 6,764,403 B2 | * | 7/2004 | Gavin | A63F 13/10 345/960 |
| 7,509,241 B2 | * | 3/2009 | Guo | G06F 17/5004 345/419 |
| 8,702,248 B1 | * | 4/2014 | Christensen | H04N 9/3129 348/744 |
| 2002/0057279 A1 | * | 5/2002 | Jouppi | G06T 3/4038 345/619 |

(Continued)

FOREIGN PATENT DOCUMENTS

| | | |
|---|---|---|
| KR | 1020050061857 A | 6/2005 |
| KR | 101214084 A | 12/2012 |

OTHER PUBLICATIONS

Bernhard Jenny, et al; "Terrain Generalization with Multi-scale Pyramids Constrained by Curvature", Cartography and Geographic Information Science, vol. 38, No. 1, pp. 110-116, Mar. 2011.

*Primary Examiner* — Thomas Lett
(74) *Attorney, Agent, or Firm* — Ladas & Parry LLP

(57) ABSTRACT

A method and apparatus for quickly generating a natural appearing terrain image. The method according to an exemplary embodiment may include generating a new terrain image through a patch-based synthesis from one or more virtual noise-based terrain models and one or more realistic terrain models; and processing blending of a boundary between synthesized terrain images in the newly generated terrain image.

18 Claims, 9 Drawing Sheets

(56) References Cited

U.S. PATENT DOCUMENTS

| | | | |
|---|---|---|---|
| 2007/0229498 A1* | 10/2007 | Matusik | G06T 17/20 345/420 |
| 2008/0143744 A1* | 6/2008 | Agarwala | G06T 3/4038 345/629 |
| 2010/0014780 A1* | 1/2010 | Kalayeh | G06T 1/00 382/284 |
| 2010/0066866 A1 | 3/2010 | Lim | |
| 2012/0218409 A1* | 8/2012 | Pritt | G01C 11/06 348/144 |
| 2013/0106832 A1* | 5/2013 | Meeker | G01C 21/3638 345/419 |

* cited by examiner

FIG. 8

| PROCESSOR<br>TERRAIN TYPE | CPU | GPU |
|---|---|---|
| SINGLE TERRAIN (413x286) | 82.509 | 17.846 |
| SINGLE TERRAIN (512x512) | 138.404 | 19.781 |
| TWO TERRAIN | 168.840 | 21.996 |
| THREE TERRAIN | 283.142 | 27.081 |

METHOD AND APPARATUS FOR QUICKLY GENERATING NATURAL TERRAIN

CROSS-REFERENCE TO RELATED APPLICATION(S)

This application claims the benefit under 35 U.S.C. §119(a) of Korean Patent Application No. 10-2014-0031207, filed on Mar. 17, 2014, in the Korean Intellectual Property Office, the entire disclosure of which is incorporated herein by reference for all purposes.

BACKGROUND

1. Field

The following description relates to a digital content production and graphics processing technology, and more specifically, to a technology of quickly generating natural appearance terrain images.

2. Description of the Related Art

The space expressed in movies, games, and education content is increasing. However, manually producing a large-scale terrain images required in the content is not desirable because a production period becomes longer. In addition, although a background of a content mostly requires a realistic expression possible in reality even in a virtual space, the production period becomes longer for a more realistic background if it is produced manually, which is also not desirable. Thus, a method for reducing the production period and generating a terrain image of high quality with high reality is required.

To reduce a period required for the terrain generation, a minimum manual production and an automated generation by a computer are required. The automated generation method may need to be designed to generate a natural appearance terrain image.

One method of the automated terrain image generation is a procedural terrain image generation technology. This technology is for generating a complex terrain image by repeatedly applying certain rules or methods. More specifically, a noise-based terrain image generation method, such as a Perlin or fractal method, is used. However, while such a procedural terrain image generation method has an advantage in easily generating a terrain image with a minimum rule generation, it has disadvantages in that there are difficulties in generating the terrain image in a direction a user intends to proceed and that the generated terrain image has high reality locally but is different from reality globally.

Another automated terrain image generation method is a technology using a digital elevation model (hereinafter referred to as DEM). The DEM uses image data extracted from a contour, an aerial photograph, and a satellite image, etc., and expresses an altitude of the given area. The DEM is extracted from a terrain image in the real world, which is very realistic. However, there is no DEM existing that expresses a virtual terrain image according to a user's exact needs or intentions. While, as mentioned previously, various methods of automating the terrain image generation and increasing the reality exist, the methods have nonmutual advantages and disadvantages.

SUMMARY

The following description relates to a method and apparatus for quickly generating a natural appearance terrain images.

In one general aspect, a method of generating terrain images includes: generating a new terrain image by using a patch-based synthesis from one or more virtual noise-based terrain models and one or more realistic terrain models; and processing the generated terrain image by blending of a boundary between synthesized terrain images into a newly generated terrain image.

In another general aspect, an apparatus of processing a terrain image includes: a first database to store one or more virtual noise-based terrain models; a second database to store one or more realistic terrain models; a terrain image synthesizer to select a noise-based terrain model from the first database, to select the realistic terrain model from the second database, and to generate a new terrain image through a patch-based synthesis from the selected terrain models; and a blending processor to process blending of a boundary between synthesized terrain images in the newly generated terrain image.

Other features and aspects may be apparent from the following detailed description, the drawings, and the claims.

BRIEF DESCRIPTION OF THE DRAWINGS

FIG. 8 is a diagram that illustrates an example of a calculation speed improvement through a parallelization process.

Figure 1:
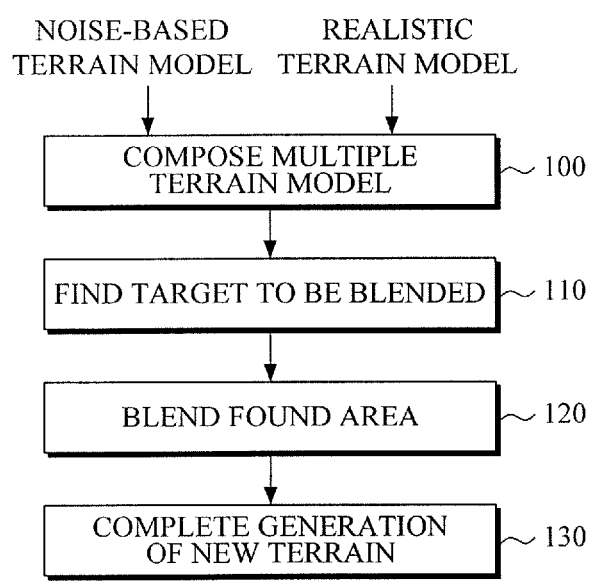
FIG. 1 is a flowchart illustrating a method of generating a terrain according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a flowchart illustrating a method of generating a terrain image according to an exemplary embodiment.

Exemplary embodiments relate to a technology of generating a new terrain image by synthesizing multiple terrain images together, such from as a noise-based terrain model and a realistic terrain model, etc., a technology of generating a natural appearing terrain image by blending an awkward area in an initial synthesized terrain image from combined models, and a technology of shortening a processing speed by parallelizing processes of calculating and minimizing error in a process of generating a new terrain image.

Referring to FIG. 1, an apparatus of processing a terrain image according to an exemplary embodiment can select a single or multiple terrain models from a noise-based terrain model and a realistic terrain model, and synthesizing the terrain image from the combined multiple terrain models as in step 100. Subsequently, the apparatus finds a target area to be blended, e.g., an awkward area at a boundary between where combined terrain models result in creating awkward intersections in the synthesized initial terrain image as in step 110. Then, the apparatus blends the found awkward area as in step 120 to thereby transform the awkward area of the initial terrain image and to generate the new terrain image as in step 130. Examples of the noise-based terrain models and the realistic terrain models are described and depicted later with reference to FIGS. 2 and 3; the process of step 100 of synthesizing an initial terrain image model are described and depicted later with reference to FIGS. 4, 6, and 7; and the process of step 120 of blending is described and depicted later with reference to FIG. 5.

Figure 2:
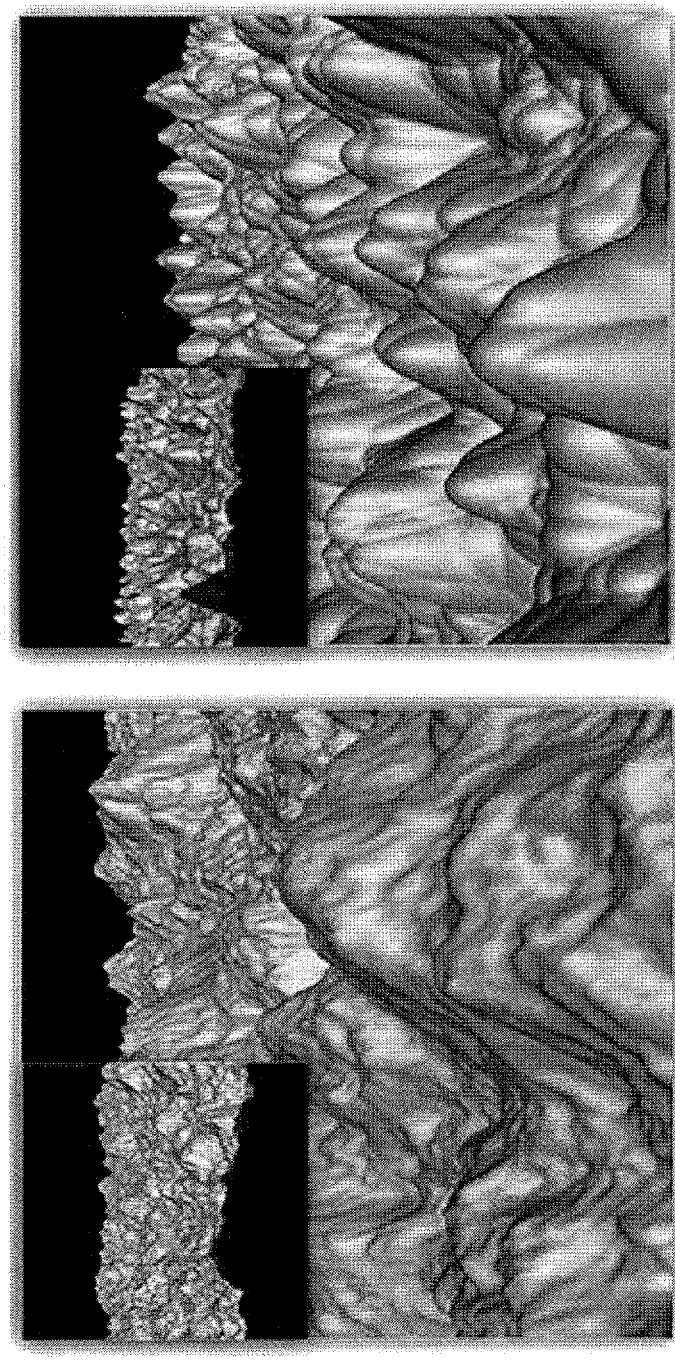
FIG. 2 illustrates examples of a virtual noise-based terrain images.
Figure 3:
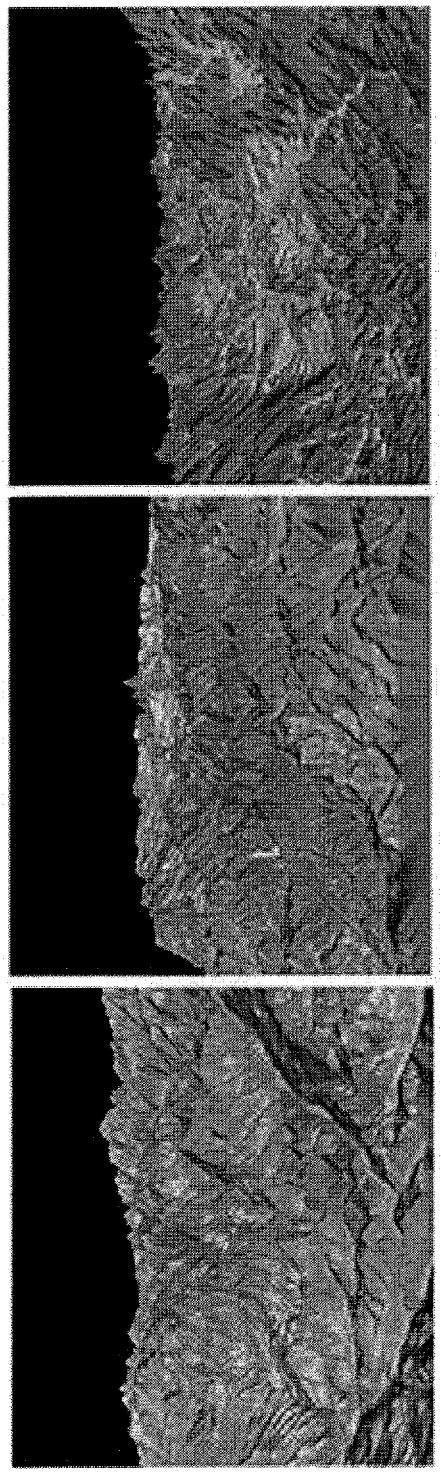
FIG. 3 illustrates examples of a realistic terrain images.

FIG. 2 is a diagram illustrating an example of a virtual noise-based terrain model; and FIG. 3 is a diagram illustrating an example of a realistic terrain model.

Referring to FIGS. 2 and 3, a virtual noise-based terrain model and a real terrain data model can be combined to generate a new terrain image with various characteristics where a user's intentions are reflected. The virtual noise-based terrain model may be, for example, a Perlin or fractal terrain model. The real terrain model may be a digital elevation model (hereinafter referred to as DEM); however, this combination is only an exemplary embodiment and is not limited thereto.

Figure 4:
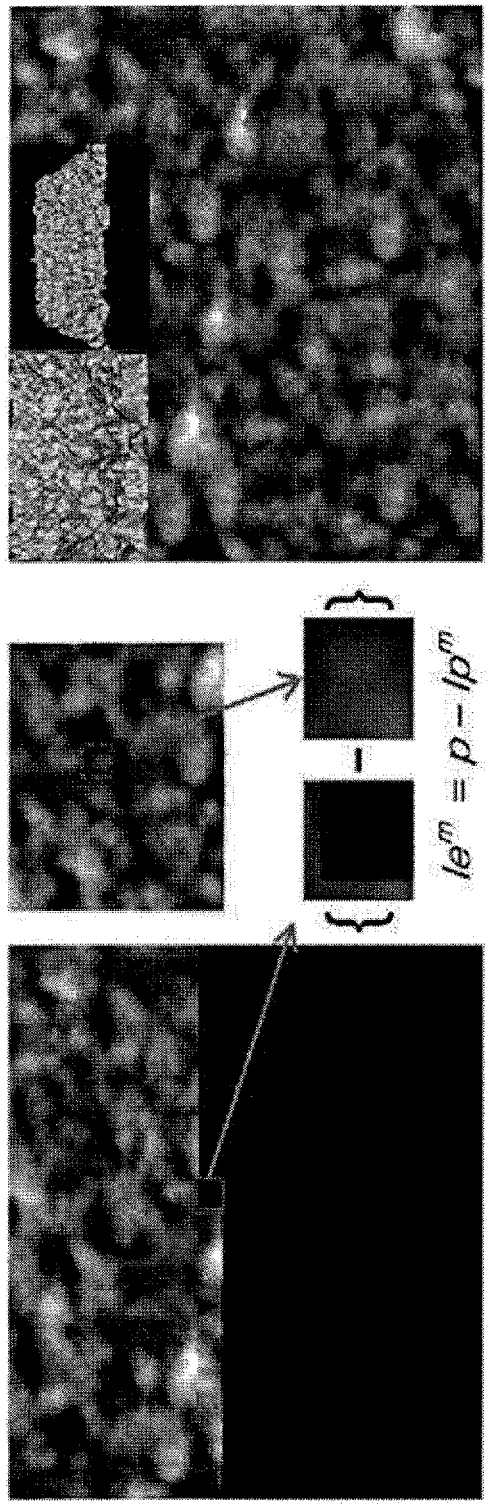
FIG. 4 illustrates an example of a new terrain image generation process using patch-based texture synthesis.

FIG. 4 illustrates an example of a new terrain generation process using a patch-based texture synthesis.

Referring to FIG. 4, a user may select single or multiple terrain models from a database and subsequently use the selected terrain models to synthesize and generate a new terrain image. Here, a terrain image, where various expressions are possible, is generated by using not only a virtual noise-based terrain model but also using a realistic terrain data model to generate a terrain image with various characteristics where a user intention is reflected.

A method of generating a terrain image suggested in the present disclosure is to generate various terrain images by using data of an existing terrain model, and the newly generated terrain image is required to adequately express characteristics of the existing terrain model. The data of the terrain model selected by the user may have different resolutions from each other, and since a size of a newly generated terrain image may be greater than the terrain model selected by the user, then characteristics of selected portions of the terrain model are required to be extracted with particularity. The present disclosure uses a patch-based texture synthesis method as a method of generating textures with a low resolution to a high resolution so as to accurately extract the characteristics from the terrain model.

The patch-based texture synthesis is a method of selecting a predetermined patch size from the original generated image, filling a new boundary area with a selected patch in which the selected patch is the most similar to the overlapping area around the new boundary area such that applying the selected patch into the new boundary area results in a calculated minimum matching error, and completes a new expanded image from the original image. Through the patch-based texture synthesis, a new expanded image may result in a higher resolution than the original image with a lower resolution. The new terrain image may also be generated by applying the above-mentioned method to terrain images generated from combinations from various terrain models.

A basic unit of the patch size may be rectangular. However, the rectangular patch size is just one example, and the basic patch size may be changed into various sizes, such as triangular or linear forms. Each newly generated selected patch is also the most similar to the selected patch used to fill the previous new boundar area. That is, the selected patch for the new boundary area to be patched is selected by calculating a minimum error from a plurality of potential patches with regard to the regularly overlapped area of newly generated boundary area with the already generated areas filled by the already generated and selected patches. Hereinafter, a method of calculating a minimum error with reference to FIG. 1 is described.

$$Ie^m = p - Ip_m$$

$$Ie_n = \min(Ie^1, Ie^2, \ldots, Ie^m)$$

$$\therefore Ie = \min(Ie_1, Ie_2, \ldots, Ie_n) \quad \text{(Formula 1)}$$

As in Formula 1, an 'm' indicates a patch number; an 'n' indicates an image number; and an 'I' indicates an image. A new image area Ie that has a minimum error indicates an image $\min(Ie_1, Ie_2, \ldots, Ie_n)$ with a minimum error from among the first image area $Ie_1$ with a minimum error to the n-th image area $Ie_n$ with a minimum error. Here, the n-th image $Ie_n$ with the minimum error indicates a patch error minimum $(Ie^1, Ie^2, \ldots, Ie^m)$ from among a newly generated first terrain patch $Ie^1$ to a newly generated m-th terrain patch $Ie^m$. The newly generated m-th terrain patch $Ie^m$ indicates a patch $(p - Ip_m)$ that is a difference between a terrain patch p to be newly generated and the m-th terrain patch $Ip^m$ of the original terrain. By selecting patches that are the most similar to selected patches that fill in the previous boundary areas through the above-mentioned process and arranging the selected patches next to each other, a final terrain image may be generated from the original generated terrain image. Here, the generated final terrain image may also have a higher resolution as compared to the original generated terrain image.

As above-mentioned, the new terrain image may be generated from data from various combinations of existing terrain models. The newly generated terrain image has various characteristics of the existing terrain models. In addition, a high resolution terrain image may be generated from a low resolution terrain model.

Figure 5:
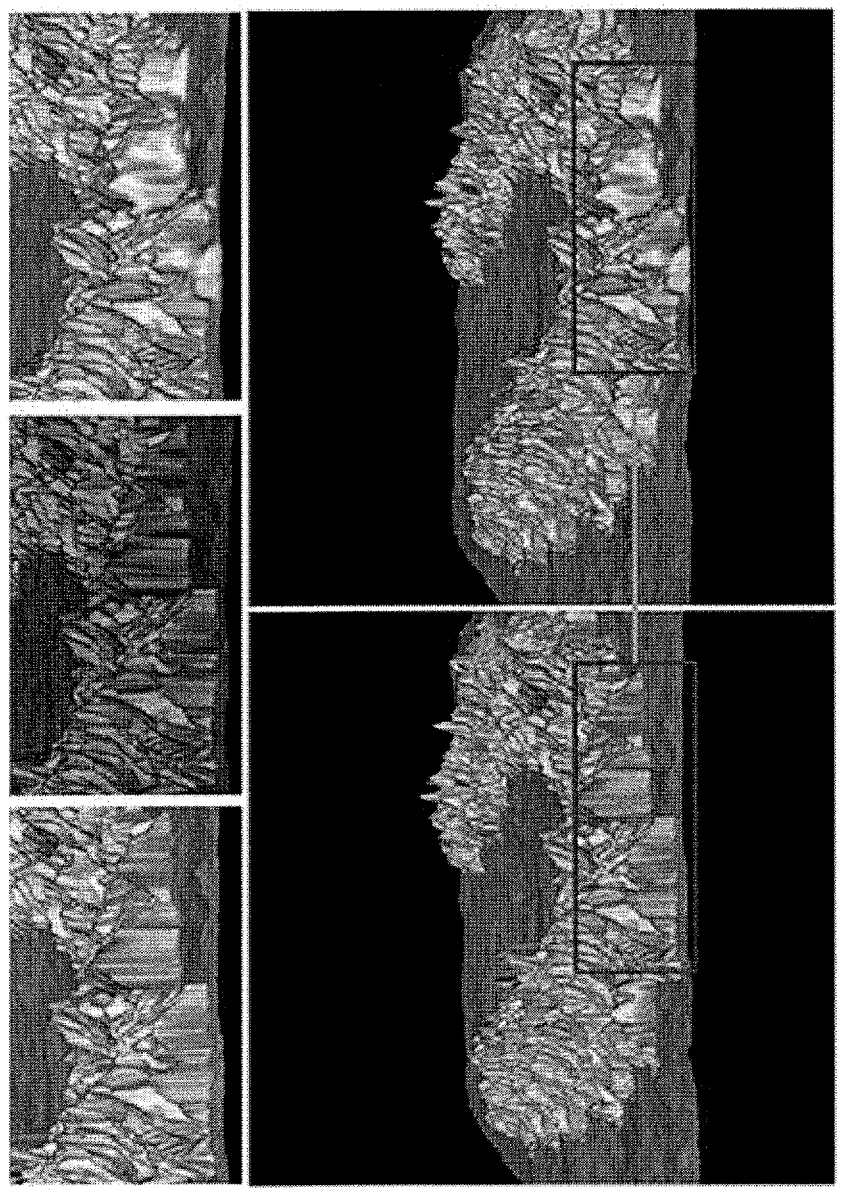
FIG. 5 illustrates an example of a process of blending an awkward area in a synthesized terrain image built from a combination of disparate terrain models.

FIG. 5 is a diagram illustrating an example of a process of blending an awkward area regarding a synthesized terrain image from a combination of using multiple terrain models.

There may be awkward parts in an original generated terrain image at interfaces or boundaries that correspond to where different terrain models that have different characteristics are used together to generate terrain images. To get rid of these awkward or unnatural appearing parts in the original generated terrain image, an apparatus of processing the original generated terrain image according to an exemplary embodiment uses a method of finding which uses rapidly changing curvature to identify and find the awkward or unnatural part as a found target area. The found target area in the original generated terrain image can be processed by blending of the found area to surrounding areas. The curvature is where a variation of the surrounding area is expressed numerically, and is used for finding a part of the original generated terrain image that rapidly changes. Then the rapidly changing curvature part is smoothed with a soft terrain model by applying smoothing with regard to the found target area.

If simple smoothing is applied, a detailed figure in the original generated terrain image may disappear. Thus, an apparatus of processing an original generated terrain image according to an exemplary embodiment may generate a natural appearing terrain image by allocating a value of the curvature as a weight in the smoothing process.

Figure 6:
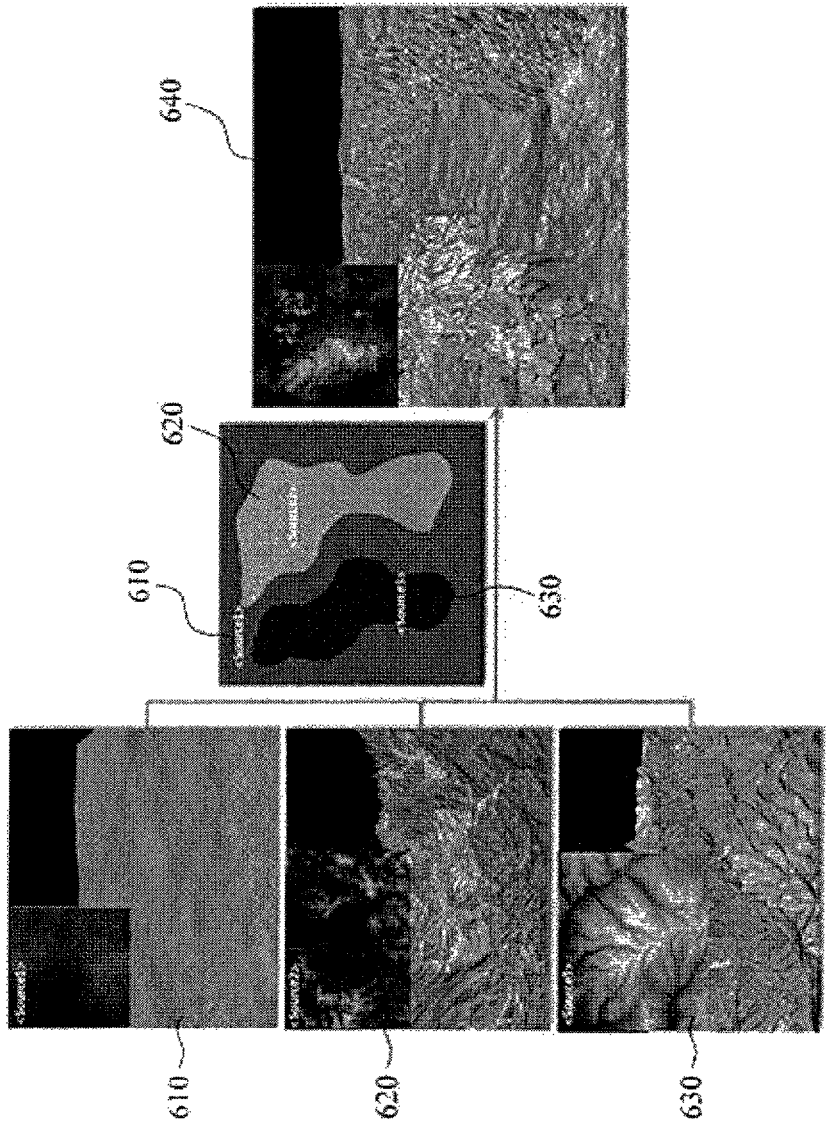
FIGS. 6 and 7 illustrate examples of a process of generating a new terrain image by using a combination of multiple and disparate terrain models.
Figure 7:
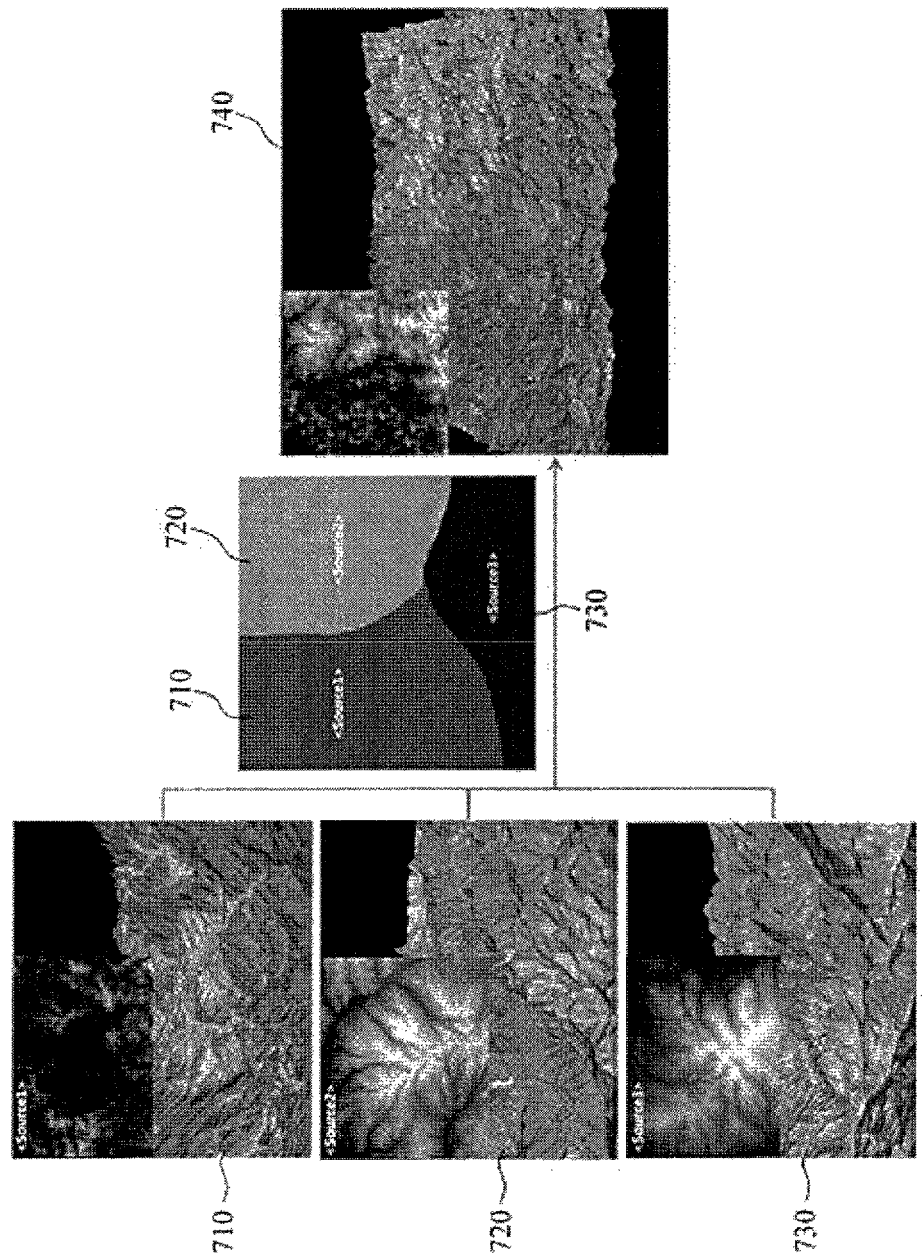

FIGS. 6 and 7 are diagrams illustrating examples of a process for generating new terrain images by using multiple terrain models.

Specifically, FIG. 6 illustrates a new terrain image 640 generated by synthesizing together various terrain images 610, 620, and 630; and FIG. 7 illustrates a new terrain image 740 generated by synthesizing together various terrain images 710, 720, and 730. Here, a patch-based terrain generating technology with regard to various forms of a terrain models is applied, and a desired terrain image may be generated from an area determined by the user.

FIG. 8 is a diagram illustrating an example of a calculation speed improvement through parallel processing.

To generate a new terrain image, multiple smoothing is required to be applied, and after the smoothing has been applied, curvature smoothing of awkward parts is required to be generated again. For performing curvature smoothing and smoothing once, for example, it may takes more than 15 seconds for an image with a 1024×1024 resolution to be processed. To solve this, an apparatus of processing a generated terrain image according to an exemplary embodiment improves its processing speed by using Compute Unified Device Architecture (CUDA). In this case, it has been checked that the time required for performing the smoothing and performing curvature smoothing of the awkward parts is shortened to less than 900 ms. In an exemplary embodiment, the apparatus of processing a terrain image applies a parallelization method using a CUDA process of calculating a minimum error to generate a patch-based new terrain image.

An apparatus of processing an original generated terrain image according to an exemplary embodiment processes the original generated terrain image in parallel through a plurality of GPUs. Generally, CPU core is expensive. Thus, if the number of cores increases to improve a computation speed, a unit price increases. Accordingly, an apparatus of processing an original generated terrain image according to an exemplary embodiment adopts a method of increasing the number of cores for the computation of GPU. A lot of tasks may be processed simultaneously by generating many threads by using CUDA which is a parallel-processing Application Programming Interface (API) that controls these cores.

In FIG. 8 illustrates a comparison between processing by CPU and by GPU in a table, and it is assumed that a newly generated terrain resolution is 1024×1024 and that a patch size unit is 60×60. A processing speed is shortened more than seven fold for a single terrain image, and more than nine times faster in multiple terrain images.

Figure 9:
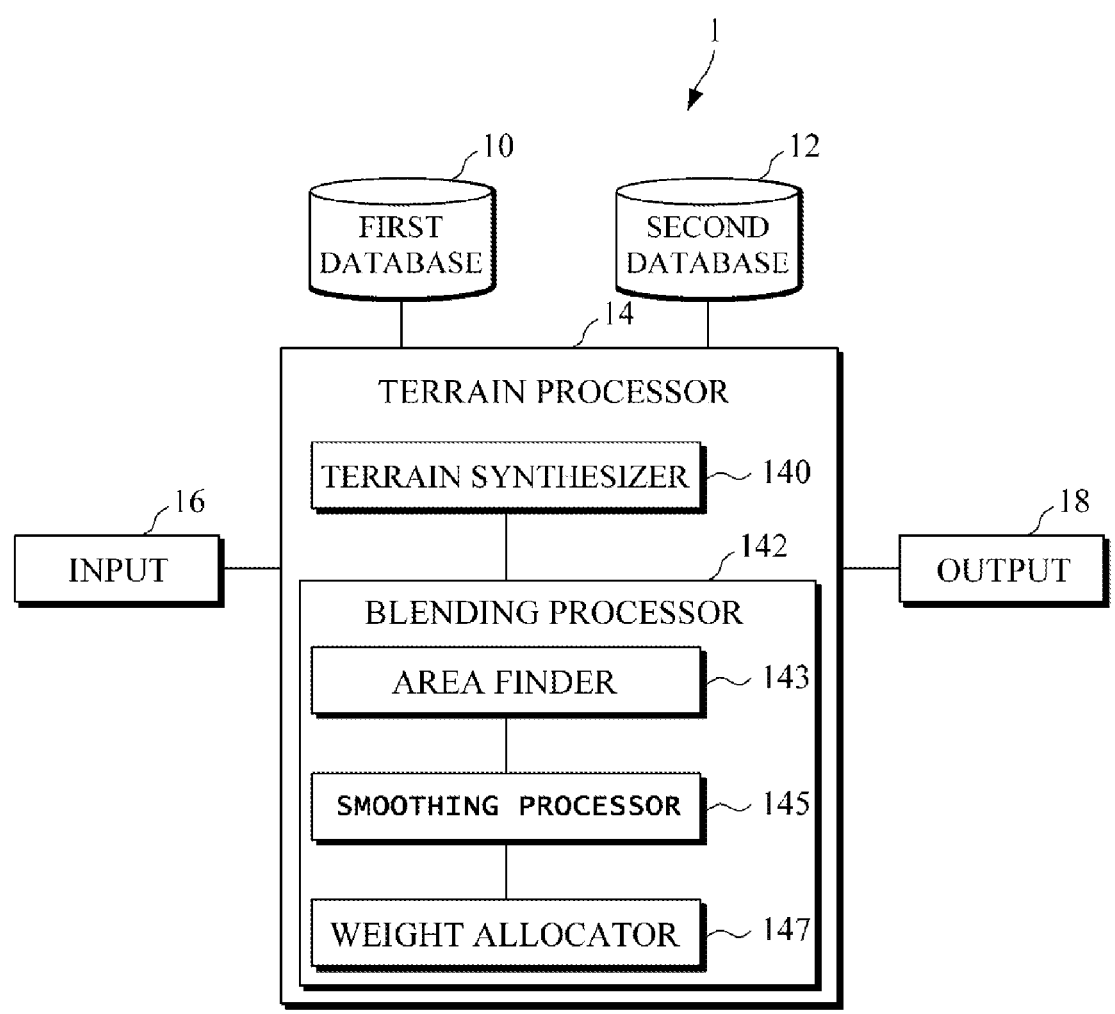
FIG. 9 is a diagram that illustrates an apparatus of processing a terrain image according to an exemplary embodiment.

FIG. 9 is a diagram illustrating an apparatus of processing a generated terrain image according to an exemplary embodiment.

Referring to FIG. 9, an apparatus 1 of processing a generated terrain image according to an exemplary embodiment includes a first database 10, a second database 12, a terrain image processor 14, an input 16, and an output 18.

The terrain image processor 14 includes a terrain image synthesizer 140 and a blending processor 142.

The first database 10 stores at least one virtual noise-based terrain model. The second database 12 stores at least one realistic terrain model. In FIG. 9, the first database 10 and the second database 12 are limited to be located in internal memory of the apparatus 1, and however, may be located in an external server. In addition, in FIG. 8, the virtual noise-based terrain model and the realistic terrain model are divided in the first database 10 and the second database 12, but may be stored in the same space.

The terrain image synthesizer 140 selects the noise-based terrain model from the first database 10, and the realistic terrain model from the second database 12, and generates a new terrain image from the selected terrain model. For a selection of the model, the input 16 may receive selection input of the noise-based terrain model and the realistic terrain model from the user.

In an exemplary embodiment, the terrain image synthesizer 140 generates a new generated terrain image through a patch-based synthesis from an original terrain image by targeting each terrain model. Here, the terrain image synthesizer 140 calculates a minimum error of an overlapped area between an already generated terrain patch area to be newly generated terrain patch area from the original terrain image. The terrain image synthesizer 140 arranges the already generated selected terrain patches that correspond to minimum errors in order to complete a new terrain image. The terrain image synthesizer 140 may generate a high-resolution new terrain image from the low-resolution original terrain image by using a patch-based synthesis technique.

The blending processor 142 processes a boundary part between the synthesized terrain images in the new terrain image generated by the terrain image synthesizer 140. In an exemplary embodiment, the blending processor 142 may include an area finder 143 and a smoothing processor 145, and further include a weight allocator 147.

The area finder 143 finds and calculates a curvature numerically expressing a variation of the surrounding area by targeting a boundary area between the terrain images in the new terrain image generated by the terrain image synthesizer 140, and finds a rapidly changing part. Then, the smoothing processor 145 applies the smoothing to the found area associated with the rapidly changing part. In an exemplary embodiment, the area finder 143 parallelizes the curvature calculation to accelerate the processing speed. The area finder 143 may use CUDA as a method for the parallel processing. The weight allocator 147 allocates a value of the curvature as weight factor in applying the smoothing.

The output 18 displays the noise-based terrain model and the realistic terrain model on a screen for a user selection through the input 16. Then, the output 18 displays a newly generated terrain image on the screen, which is generated by the terrain synthesizer 140 and the blending processor 142. In addition, the output 18 may, on the screen, display the terrain image that is in the synthesizing process.

In an exemplary embodiment, a method and apparatus for quickly generating a natural appearing terrain image may generate a new terrain image by using various terrain characteristics from a virtual noise-based terrain model and a realistic terrain model, and may generate a new terrain image having a high-resolution, suitable for a user's intention, by using a patch-based texture synthesis method to thereby increase the accuracy. Moreover, the method and apparatus may generate a natural terrain image by using a blending process that uses a curvature to identify and to remove an awkward part between the synthesized dissimilar terrain images.

Furthermore, the method and apparatus may generate the new terrain image quickly. In other words, the method and apparatus process in parallel a curvature calculation, etc., that requires a calculation quantity to thereby reduce the processing time consumed for the calculation so that a new terrain image may be generated quickly.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a new terrain image, the method comprising:
    generating an original terrain image through a patch-based synthesis from one or more virtual noise-based terrain models and one or more realistic terrain models; and
    blending a boundary of the original terrain image to expand the boundary of the original terrain image, wherein blending comprises:
        selecting a patch size from the original terrain image;
        selecting a patch area from the original terrain image which is calculated to have a minimum matching error between a regularly overlapped boundary area of the original terrain image and that of the selected patch area; and
        adding the selected patch area onto the boundary of the original terrain image to complete the new terrain image.

2. The method of claim 1, wherein the one or more noise-based terrain models are at least one of a Perlin terrain model and a fractal terrain model.

3. The method of claim 1, wherein the one or more realistic terrain models are a digital elevation model (DEM).

4. The method of claim 1, wherein generating the new terrain image utilizes a patch-based synthesis on each terrain model used to generate the original terrain image.

5. The method of claim 1, wherein the new terrain image has a higher resolution than that of the original terrain image.

6. The method of claim 1, wherein blending comprises parallelizing the calculation of the minimum matching error to accelerate a processing speed.

7. The method of claim 1, further comprises:
    calculating and finding a curvature area within the original terrain image; and
    smoothing the found curvature area.

8. The method of claim 7, wherein calculating and finding comprises parallelizing the calculation of the curvature area to accelerate a processing speed.

9. The method of claim 8, wherein calculating and finding comprises using Compute Unified Device Architecture (CUDA) as a method for parallel processing.

10. The method of claim 8, wherein calculating and finding comprises parallel-processing through multiple Graphics Processing Units (GPUs).

11. The method of claim 1, further comprising: receiving input of selection of one or more noise-based terrain models and one or more realistic terrain models from a user.

12. An apparatus, configured to synthesize a new terrain image, the apparatus comprising:
    a first database configured to store one or more virtual noise-based terrain models;
    a second database configured to store one or more realistic terrain models;
    a terrain image synthesizer configured to
        select at least one noise-based terrain model from the first database,
        select at least one realistic terrain model from the second database, and
        generate an original terrain image through a patch-based synthesis from the selected terrain models; and
    a blending processor configured to blend a boundary of the original terrain image to synthesize the new terrain image by
        selecting a patch size from the original terrain image;
        selecting a patch area from the original terrain image which is calculated to have a minimum matching error between a regularly overlapped boundary area of the original terrain image and that of the selected patch area; and
        adding the selected patch area onto the boundary of the original terrain image to synthesize the new terrain image.

13. The apparatus of claim 12, wherein the terrain image synthesizer is configured to generate the original terrain image through the patch-based synthesis on each selected terrain model used for generating the original terrain image, and.

14. The apparatus of claim 12, wherein the new terrain image has a higher resolution than the original terrain image.

15. The apparatus of claim 12, wherein the blending processor is configured to calculate and find a curvature in the original terrain image; and
    configured to smooth the curvature.

16. The apparatus of claim 15, wherein the apparatus is configured to parallelize the calculation of the curvature to accelerate a processing speed.

17. The apparatus of claim 16, wherein the apparatus is configured to use CUDA (Compute Unified Device Architecture) as a method for parallel processing.

18. The apparatus of claim 12, wherein the apparatus is receive input of selection of one or more noise-based terrain models and one or more realistic terrain models from a user.

* * * * *